United States Patent [19]

Ishikawa et al.

[11] Patent Number: 5,124,288
[45] Date of Patent: Jun. 23, 1992

[54] REFRACTORY MATERIAL CONTAINING CALCIUM CARBONATE-STABILIZED SYNTHETIC DOLOMITE

[75] Inventors: Kentaro Ishikawa, Okazaki; Teruhiko Taniguchi, Toyohashi, both of Japan

[73] Assignee: Quigley Company Inc., New York, N.Y.

[21] Appl. No.: 745,574

[22] Filed: Aug. 15, 1991

[51] Int. Cl.$^5$ ............................................. C09B 35/06
[52] U.S. Cl. ................................... 501/121; 501/108; 266/286
[58] Field of Search ................. 501/108, 121; 266/275, 266/280, 286

[56] References Cited

U.S. PATENT DOCUMENTS 4,839,317  6/1989  Uchida et al. .................... 501/108
4,923,831  5/1990  Uzaki et al. ...................... 501/108

Primary Examiner—William R. Dixon, Jr.
Assistant Examiner—Chris Gallo
Attorney, Agent, or Firm—Peter C. Richardson; Lawrence C. Akers; Howard R. Jaeger

[57] ABSTRACT

A refractory material containing a synthetic dolomite aggregate having a calcium carbonate coating on the surface thereof and further containing magnesia, a binder, a plasticizer, an organic fiber homogenizer, a bond stabilizer, and a dispersant; and a method of forming a protective refractory surface on the lining of a tundish, steel ladle and the like by spraying, gunning or troweling the surface coated aggregate-containing refractory material thereon are disclosed. This material offers the multiple advantages of improving resistance to slaking, reducing alumina inclusions in the steel, and reducing clogging of the tundish nozzle.

5 Claims, 2 Drawing Sheets

REFRACTORY MATERIAL CONTAINING CALCIUM CARBONATE-STABILIZED SYNTHETIC DOLOMITE

BACKGROUND OF THE INVENTION

The present invention relates to a refractory material, including sprayable material, gunnable material, and trowelable material, to be used principally for coating the surface of the back-up lining of a continuous casting tundish, steel ladle, and the like.

Conventionally, refractory material capable of being applied as a coating by spraying, gunning, or troweling, has been used for repairing the surface of a continuous casting tundish, steel ladle, and the like. Refractory materials using an aggregate of magnesia are generally used in such a coating refractory, but refractory materials using an aggregate of calcia such as lime and dolomite are known as well.

When a basic refractory containing a calcia aggregate is used in a tundish, CaO in the aggregate selectively adsorbs, or as it is termed in the art, "catches", alumina and other non-metallic impurities which are contained in molten steel and which have a detrimental effect on final steel quality. The relative ability of a calcia-containing refractory to remove alumina and other impurities is referred to as the "catch capability" of the refractory. Reduction in the amount of these impurities also significantly reduces the occurrence of clogging in the tundish nozzle caused by the deposition of impurities on the inner surface wall of the nozzle. This selective catching property of CaO is metallurgically beneficial in that it results in higher purity steel.

However, when refractory material using a calcia aggregate is applied to the inner surface of tundishes and steel ladles, by any of the methods of spraying, gunning, or troweling, all of which require the use of water, cracks may be generated and material flaking or spalling may occur due to CaO in the aggregate reacting with the water (i.e. slaking) during subsequent curing, drying or preheating. Accordingly, the application of calcia-aggregate containing refractory material is currently limited to use in non-aqueous systems.

The objective of the present invention is to provide a refractory material, which can be applied by any of the methods of spraying, gunning or troweling, to a tundish or steel ladle, in either a hot or cold state, and even in a situation where water is used. This is achieved in the present invention by including in the refractory a specific synthetic dolomite aggregate having an excellent slaking resistance.

SUMMARY OF THE INVENTION

The refractory material for tundishes and steel ladles according to the present invention comprises from about 30 to about 90% by weight of an aggregate of stabilized synthetic dolomite containing at least 30% by weight of CaO. This stabilized synthetic dolomite aggregate has a coating layer of $CaCO_3$ on its surface and has a particle size of up to about 10 mm. Advantages of using the refractory composition of the present invention include improving the resistance to slaking, reducing the alumina content in the metal, and reducing the occurrence of clogging in the tundish nozzle.

DETAILED DESCRIPTION OF THE INVENTION

Figure 1:
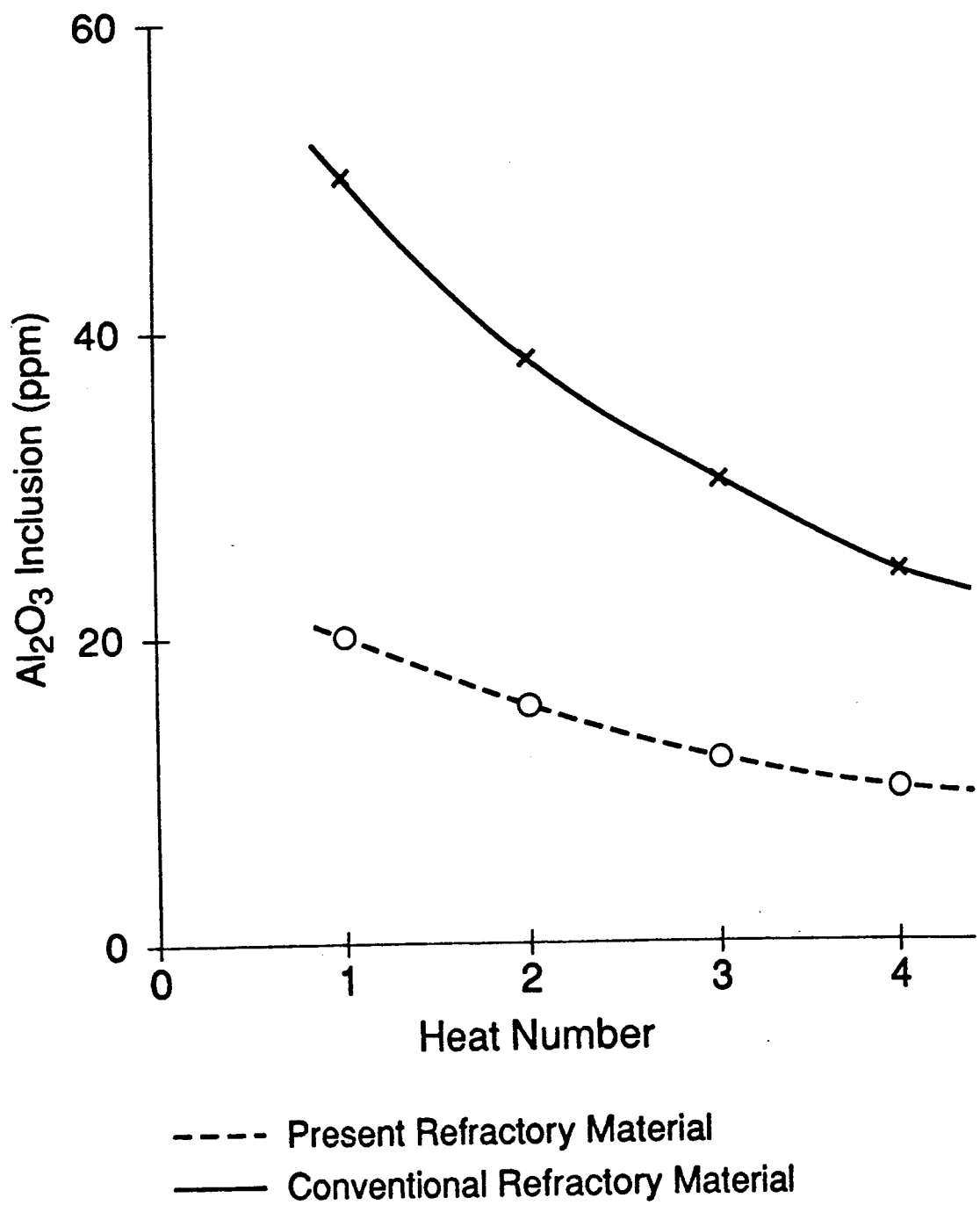
FIG. 1 is a comparative plot of alumina catch for the present refractory material and a conventional refractory material.

The refractory material for tundishes, steel ladles, and the like according to the present invention, is mainly used as a sprayable material, gunnable material or a trowelable material. The composition of the material is modifiable according to the method of application. The refractory material is composed of an aggregate, a binding material, a plasticizer, a homogenizer, a bond stabilizer and a dispersion/wetting agent.

The aggregate is a specific synthetic dolomite which has been treated with carbonate gas to form a surface coating of calcium carbonate thereon. This synthetic dolomite which has been subjected to such surface treatment, contains 30–95% by weight of CaO. When the synthetic dolomite has a CaO content less than 30% by weight, the accompanying metallurgical benefits, which occur in steelmaking due to the catching of alumina and other non-metallic impurities, is not satisfactorily exhibited. However, if the calcium carbonate coated synthetic dolomite has a CaO content greater than 95% by weight, the metallurgical benefits of a high CaO content are offset by the material having a poorer resistance to slaking.

A synthetic dolomite having a particle size greater than about 0.04 mm and less than about 10 mm is used, with from about 0.04 mm to about 5 mm being preferred. For application as a spraying or gunning material, the preferred optimum particle size of the synthetic dolomite is 3 mm or less. This is to suppress rebound loss when the material is applied. The preferred optimum particle size for application as a trowelled material is 5 mm or less. A larger particle size material can be utilized in the trowellable application because the kneading step performed when preparing a trowelable material with a mixer imparts sufficient viscosity and flexibility to the material despite the larger particle size. Therefore, material initially having a coarse particle size can be used in a trowelable material. In fact, excellent performance as to durability is obtained through the use of coarse synthetic dolomite particles in a trowelable material. The principal reason that the particle size of the synthetic dolomite is specified as 0.04 mm or coarser is because finer particles have a larger surface area which is detrimental to the slaking resistance of the material. The slaking resistance of a refractory material containing particles finer than 0.04 mm is not improved, even after treatment with gaseous $CO_2$ to form a carbonate coating on the particles.

The calcium carbonate coated synthetic dolomite is manufactured by subjecting a synthetic dolomite aggregate to an atmosphere having a $CO_2$ concentration of 80% or more, at a temperature of from about 400° to about 800° C., for from about 3 to about 6 hours. During this process, the surface of the synthetic dolomite contacts and reacts with $CO_2$ to form a coating layer of $CaCO_3$. The process variables of $CO_2$ concentration, temperature and treatment time may be modified, depending on the aggregate to be coated. The thickness of the $CaCO_3$ coating layer on synthetic dolomite is from about 0.4 to about 1.0 μm, with from about 0.8 to about 1.0 μm being preferred.

The above surface coating process is preferably carried out after preparing the synthetic dolomite having a particle size suitable for use as an aggregate in the product formulation for the refractory material. This is to prevent the exposure of uncoated, fresh surface, which is formed upon milling, grinding or pulverizing. Uncoated fresh aggregate surface introduces hydration problems and consequently reduces the slaking resistance of the material.

The $CaCO_3$ coated synthetic dolomite may be compounded with other basic aggregates, for example, sea water magnesia, natural magnesia and olivine. In particular, the compounding of magnesia having a particle size of up to about 0.04 mm with the synthetic dolomite is preferred. This is due to synthetic dolomite having a particle size of up to about 0.04 mm exhibiting excessively large surface area, which is not suitable in this application. The compounding aggregate is added to the dolomite in an amount of from 0 to about 65% by weight in the refractory material. In addition to an aggregate, refractory material according to the present invention contains up to about 5.0 weight percent of a homogenizer in the form of an organic fiber; up to about 6.0 weight percent of a binder, which binds with the refractory material, the binder being selected from the group consisting of alkali metal silicates, alkali metal phosphates, and combinations thereof, with sodium silicate and monosodium phosphate being preferred; up to about 5.0 weight percent of a plasticizer, which enhances the ability of the refractory material to adhere to the surface to which it is applied, the plasticizer being selected from the group consisting of a clay, such as bentonite or ball clay, a silica powder, and mixtures thereof; up to about 5.0 weight percent of a bond stabilizer, the bond stabilizer being at least one of an organic acid, preferably an aliphatic di- or tri-carboxylic, more preferably, an organic acid selected from the group consisting of tartaric, citric, oxalic, and malic acids, and mixtures thereof, or calcium carbonate; and up to 1.0 weight percent of a dispersion/wetting agent, preferably a lignin calcium sulphonate.

According to the present invention, a refractory material contains from about 30 to about 90% by weight of the $CaCO_3$ coated/stabilized synthetic dolomite aggregate. The metallurgical benefits of this refractory material for a tundish or steel ladle are not fully achieved in a situation where there is less than 30% by weight of the stabilized synthetic dolomite aggregate. In contrast, a refractory material, containing more than 90% by weight of the synthetic dolomite aggregate, causes difficulty because of reduced slaking resistance of the material.

Refractory material of the present invention possesses remarkably improved slaking resistance compared with conventional refractory material. This is because the $CaCO_3$ synthetic dolomite aggregate is stable when in contact with water. The coating layer of $CaCO_3$ on the aggregate gives a high slaking resistance.

Therefore, the present refractory material can be used as a trowelable material, sprayable or gunnable material, even though water is added thereto for application by any of those means. In addition, the refractory material of the present invention can be applied to either a hot or cold surface, with no cracking or material flaking occurring.

Because the surface refractory material contains a $CaCO_3$-based synthetic dolomite aggregate, the metallurgical benefits in the purification of steel, such as the ability to catch alumina and other non-metallic impurities from the molten steel are fully realized. Particulate impurities in the molten steel, known as "inclusions," such as alumina and other non-metallic impurities, which clog a tundish nozzle are dramatically reduced by the use of the refractory material of the present invention, as compared with the use of a conventional refractory material.

EXAMPLES

The present invention can be more fully understood by the following examples, which are not intended to be in any way limiting of the scope of the invention, as set forth in the claims.

EXAMPLE 1

A. Formulation of Refractory Material

A sprayable refractory material of the present invention was prepared, following the compounding ratio shown below:

| $CaCO_3$ coated synthetic dolomite aggregate product (CM-45, manufactured by Shin-Nihon Chemical Industry. Co. Ltd.) | |
| --- | --- |
| Particle size of 1 to 3 mm | 38% by weight |
| Particle size less than 1 mm | 27% by weight |
| Sea water magnesia | 28.2% by weight |
| Particle size less than 0.04 mm | |
| Organic pulp fiber | 1.7% by weight |
| Sodium silicate (binder) | 2.5% by weight |
| Malic acid (bond stabilizer) | 0.6% by weight |
| Bentonite (plasticizer) | 2.0% by weight |

To 100 parts by weight of the above material was added 22 parts by weight of water. The resulting mixture was cold sprayed onto the surface of the back-up lining of a tundish to form a layer having a thickness of about 25 mm. No cracking or flaking of the refractory material was observed upon subsequent air curing.

B. Reduction in Tundish Nozzle Clogging

A comparative test was made to demonstrate that use of the refractory material of the present invention as a tundish lining results in a reduction in tundish nozzle clogging and that there is an improvement in operability, over use of a conventional MgO clinker-based refractory material.

A tundish with a 20-ton capacity was cold-sprayed with the refractory material of the present invention, as in Part A, to form a removable refractory lining therein. The tundish was then preheated to a temperature of 2000° F. and placed in service in a continuous casting station. A continuous sequence of five heats of molten steel, each of 84 tons per heat, was then passed through the tundish, exiting through an exit nozzle in the tundish.

For comparative purposes, the above sequence was repeated using a tundish coated with a lining made of a conventional MgO clinker-based material.

After completion of all five heats, the tundishes were removed from service and cooled. A chemical and X-ray diffraction analysis of the impurity-containing substance deposited on the inside surface of the nozzle, which ranged in thickness of from 0 to 10 mm on the nozzle of the tundish lined with the refractory material of the present invention, but was significantly thicker, up to about 25 mm, on the surface of the nozzle of the tundish lined with a conventional refractory material, was made for both the tundishes. The chemical composition and relative presence of various mineral compounds, as disclosed by X-ray diffraction of the deposits in both tundish nozzles, is shown in Table 1.

TABLE 1

Chemical and mineral analysis of deposits in the tundish nozzle

| | Present Refractory Material | Conventional MgO Clinker Based Material |
|---|---|---|
| Chemical Composition (%) | | |
| MgO | 2.5 | 7.7 |
| CaO | 1.0 | 3.1 |
| $SiO_2$ | 0.4 | 0.4 |
| $Al_2O_3$ | 78.3 | 82.5 |
| $Fe_2O_3$ | 15.7 | 4.2 |
| Minerals (Relative presence) | | |
| $\alpha$-$Al_2O_3$ | +++ | +++ |
| $MgO\cdot Al_2O_3$ | + | +++ |
| $CaO\cdot 6Al_2O_3$ | + | 0 |
| $CaO\cdot 2Al_2O_3$ | + | 0 |
| $3CaO\cdot 5Al_2O_3$ | + | 0 |

As is seen from Table 1, the refractory material of the present invention causes a reduction in the alumina inclusion in the metal, as indicated by the lower alumina chemical content in the deposit (78.3% versus 82.5% for the conventional refractory material). This is due to the high reactivity of alumina with CaO in the refractory. The calcium aluminate phases formed in the refractory of the present invention are mineral complex species with lower melting points than alumina itself, and magnesium aluminate, which are the only species formed in the conventional MgO clinker-based refractory. These complexes more readily penetrate the refractory material of the present invention, thereby giving it a greater alumina catch capability. These additional alumina-containing species are not formed with conventional MgO clinker based refractory material.

This comparative test demonstrated that use of the refractory material of the present invention significantly reduces the occurrence of deposition of occluding matter in the tundish nozzle (deposited matter, namely, non-metallic "inclusion", principally comprising alumina), as compared with the use of conventional sprayed refractory material.

C. Increased Alumina Catch Capability of Refractory Material and Reduction of Alumina Inclusion in Metal A comparative test was made to demonstrate the increase in the alumina catch capability of the refractory material of the present invention over conventional MgO clinker-based refractory and to show that use of the present refractory material results in the production of a better grade metal due to a reduction of alumina inclusion in the metal.

A tundish with a 50-ton capacity was cold-sprayed with the refractory material of the present invention, as in Part A, to form a removable refractory lining therein. The tundish was then preheated to a temperature of 2000° F. and placed in service in a continuous casting station. A continuous sequence of four heats of molten steel, each of 250 tons per heat, was then passed through the tundish, exiting through an exit nozzle in the tundish.

For comparative purposes, the above sequence was repeated using a tundish coated with a lining made of conventional MgO clinker-based material.

After each heat, a sample of the molten metal in the tundish was removed for analysis for alumina inclusion. The comparative results for each heat, for both the present refractory material and the conventional refractory material, are shown in FIG. 1. As is seen from FIG. 1, the amount of alumina inclusion in the metal is significantly lower in each heat for the tundish which was lined with the refractory material of the present invention, than for the tundish which was lined with the conventional MgO clinker-based refractory.

After completion of all four heats, the tundishes were removed from service and cooled. The refractory linings were removed and analyzed for alumina catch. The comparative results are shown in Table 2 and FIG. 2.

TABLE 2

Chemical analysis of refractory materials after use

| Chemical Composition (%) | Present Refractory Material | | | | Conventional MgO Clinker Based Material | | | |
|---|---|---|---|---|---|---|---|---|
| | Distance from surface (mm) | | | | | | | |
| | 5 | 10 | 15 | 20 | 5 | 10 | 15 | 20 |
| MgO | 39.9 | 47.3 | 53.3 | 65.3 | 69.1 | 75.3 | 81.0 | 79.2 |
| CaO | 11.4 | 28.9 | 30.7 | 25.1 | 7.3 | 4.1 | 2.1 | 2.8 |
| $SiO_2$ | 2.8 | 6.5 | 7.3 | 6.1 | 9.2 | 9.5 | 8.1 | 11.1 |
| $Al_2O_3$ | 8.1 | 9.4 | 5.9 | 1.6 | 8.3 | 5.0 | 3.2 | 2.3 |
| $Fe_2O_3$ | 31.4 | 3.0 | 0.8 | 0.3 | 3.2 | 3.0 | 2.7 | 2.0 |

Figure 2:
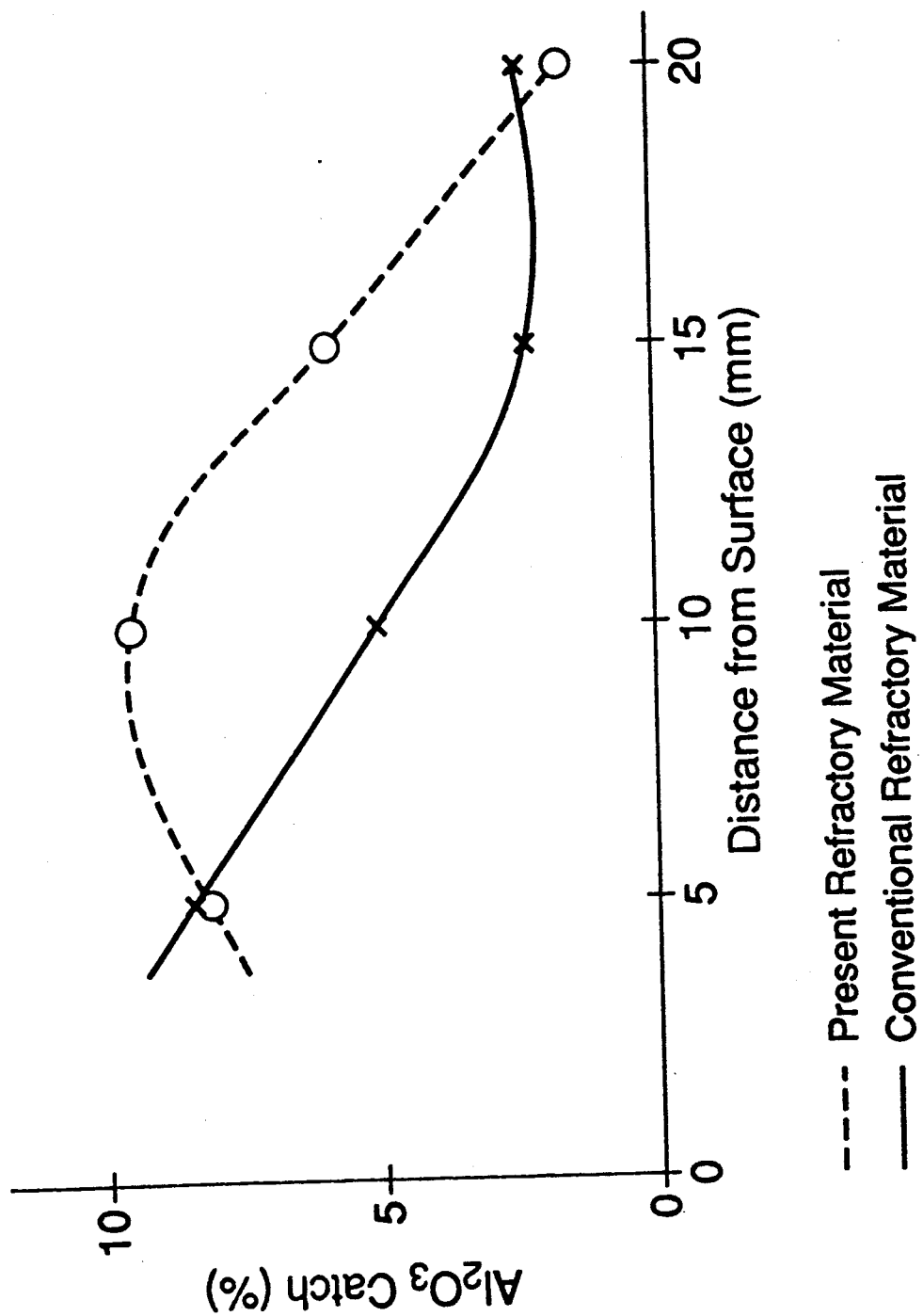
FIG. 2 is a comparative plot of alumina inclusion in metal processed through tundishes lined with the refractory material of the present invention and a conventional refractory material.

As seen from Table 2 and FIG. 2, the amount of $Al_2O_3$ catch in the refractory material, measured at several penetrative distances from the outer surface of the lining exposed to the molten metal was substantially higher at penetrative distances of from about 7 to about 15 mm for the refractory, thereby demonstrating the superior alumina catch capability of the refractory material of the present invention over conventional material.

D. Conclusion

The refractory material of the present invention reduces tundish nozzle clogging and reduces the amount of undesirable alumina inclusion in the metal. Without wishing to be limited to a particular explanation of the effectiveness of the refractory material of the present invention in accomplishing this, one reason is believed to be that alumina suspended in the molten metal reacts with CaO in the refractory material of the present invention and forms calcium aluminates, which have lower melting points than alumina and magnesium aluminate. These calcium aluminates are better able to penetrate into the refractory material, expressed as a higher equivalent alumina catch capability of the refractory material of the present invention. In combination with this effect, the calcium aluminates are lighter than the alumina and float to the surface of the molten metal bath where they can be skimmed-off. Together, both of these effects function to reduce the amount of alumina inclusion in the metal and the extent of alumina deposits in the tundish nozzle.

EXAMPLE 2

A trowelable refractory material of the present invention was prepared, following the compounding ratio shown below.

| CaCO₃ coated synthetic dolomite aggregate product (CM-45, manufactured by Shin-Nihon Chemical Industry, Co. Ltd.) | |
| --- | --- |
| Particle size of 30 to 5 mm | 15% by weight |
| Particle size of 10 to 3 mm | 15% by weight |
| Particle size less than 1 mm | 34% by weight |
| Sea water magnesia Particle size less than 0.04 mm | 27% by weight |
| CaCO₃ (bond stabilizer) | 5% by weight |
| Silica powder (plasticizer) | 2% by weight |
| Monobasic sodium phosphate (binder) | 0.2% by weight |
| Lignin calcium sulphonate (dispersnat/wetting agent) (P-201, manufactured by Sanyo Kokusaku Pulp, Co. Ltd) | 0.2% by weight |
| Organic pulp fiber (homogenizer) | 1.6% by weight |

The trowelable material comprising the above ingredients was cold-trowelled onto the face of the lining base material of a tundish, to form a coating layer of a thickness of about 25 mm. When the obtained coating layer was examined, no cracking or material flaking of the coating was observed, indicating the excellent condition of the coating.

We claim:

1. A refractory material for use in a molten-metal containing vessel including a tundish, and a steel ladle, comprising:

from about 30 to about 90 percent, based on the total weight of the material, of a synthetic dolomite aggregate containing from about 30 to about 95 percent, based on the weight of dolomite, of calcium oxide, said dolomite having a particle size of from about 0.04 to about 5 mm, and a coating layer of calcium carbonate of from about 0.8 to about 1.0 μm on the surface thereof;

from 0 to about 65 percent, based on the total weight of the material, of magnesia;

from 0 to about 6 percent, based on the total weight of the material, of a binder selected from the group consisting of alkali metal silicates, alkali metal phosphates and mixtures thereof;

from 0 to about 5 percent, based on the total weight of the material, of a plasticizer selected from the group consisting of clay, silica powder, and mixtures thereof;

from 0 to about 5 percent, based on the total weight of the material, of an organic fiber homogenizer;

from 0 to about 5 percent, based on the total weight of the material, of a bond stabilizer selected from the group consisting of aliphatic di- and tri-carboxylic acid and mixtures thereof and calcium carbonate;

from 0 to about 1 percent, based on the total weight of the material, of a dispersant;

such that the refractory material is capable of being applied to a surface in a hot or a cold state; the refractory material exhibits good slaking resistance; and the refractory material exhibits good catch capability of both alumina and non-metallic impurities in molten material with which the refractory material comes into contact, thereby reducing the occurrence of clogging in nozzles and conduits through which said molten material which has been in contact with the refractory material flows.

2. The refractory material according to claim 1 wherein:

the calcium carbonate-coated synthetic dolomite aggregate is 65.0 weight percent of the total material;

the magnesia is 28.2 weight percent of the total material;

the binder is sodium silicate and is 2.5 weight percent of the total material;

the plasticizer is bentonite clay and is 2.0 weight percent of the total material;

the organic fiber homogenizer is a pulp and is 1.7 weight percent of the total material; and the bond stabilizer is malic acid and is 0.6 weight percent of the total material.

3. The refractory material according to claim 1 wherein:

the calcium carbonate coated synthetic dolomite aggregate is 64.0 weight percent of the total material;

the magnesia is 27.0 weight percent of the total material;

the binder is monobasic sodium phosphate and is 0.2 weight percent of the total material;

the plasticizer is silica powder and is 2.0 weight percent of the total material;

the organic fiber homogenizer is a pulp and is 1.6 weight percent of the total material;

the bond stabilizer is calcium carbonate and is 5.0 weight percent of the total material; and the dispersant is lignin calcium sulphonate and is 0.2 weight percent of the total material.

4. A method for protecting a lining material in a molten-metal containing vessel including a tundish, steel ladle comprising applying to the surface of said lining a refractory material containing from about 30 to about 90 weight percent in the material of a synthetic dolomite aggregate containing from about 30 to about 95 weight percent, based on the dolomite, of calcium oxide, said dolomite having a particle grain size of from about 0.04 to about 5 mm, and a coating layer of calcium carbonate of from about 0.8 to about 1.0 μm on the surface thereof;

from 0 to about 65 percent, based on the total weight of the material, of magnesia;

from 0 to about 6 percent, based on the total weight of the material, of a binder selected from the group consisting of alkali metal silicates, alkali metal phosphates and mixtures thereof;

from 0 to about 5 percent, based on the total weight of the material, of a plasticizer selected from the group consisting of clay, silica powder, and mixtures thereof;

from 0 to about 5 percent, based on the total weight of the material, of an organic fiber homogenizer;

from 0 to about 5 percent, based on the total weight of the material, of a bond stabilizer selected from the group consisting of aliphatic di- and tri-carboxylic acid and mixtures thereof; and from 0 to about 1 percent, based on the total weight of the material, of a dispersant.

5. The method according to claim 4 wherein the refractory material is applied to the lining by means selected from the group consisting of gunning, spraying and troweling.

* * * * *